Nov. 21, 1933.  C. K. HUTHSING ET AL  1,936,359
COUPLING MEANS
Filed March 31, 1932   3 Sheets-Sheet 1
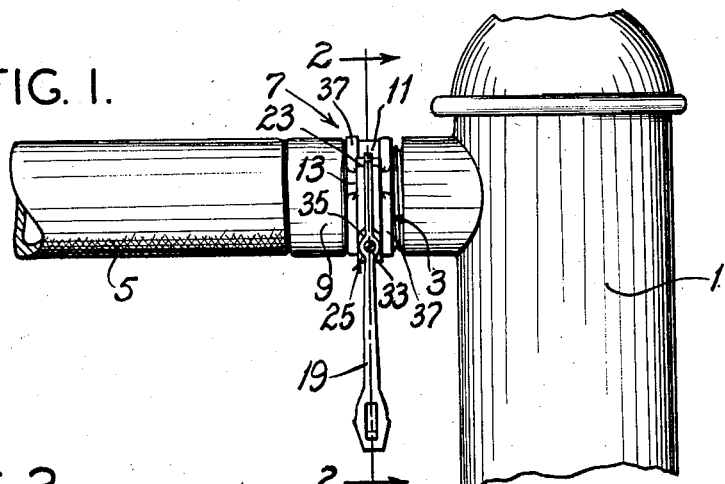
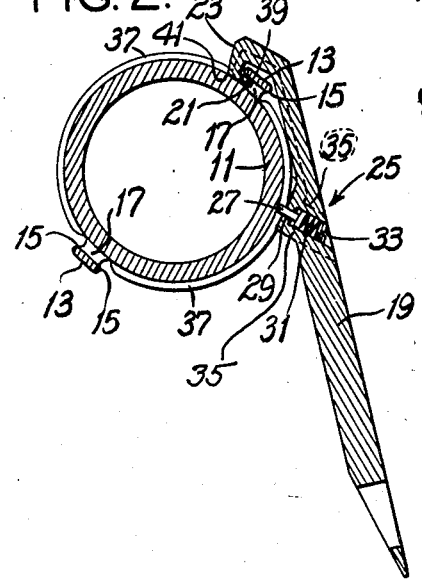
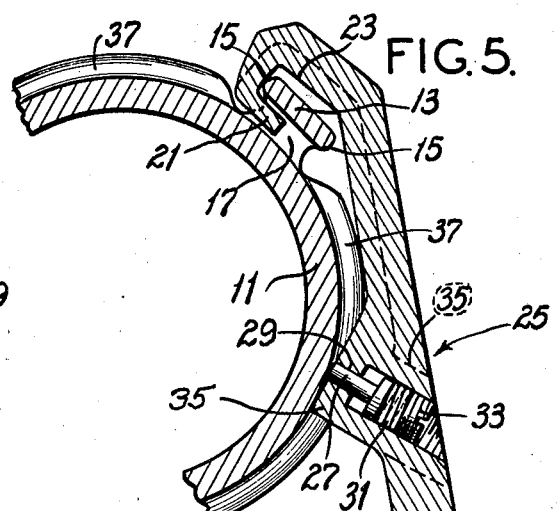
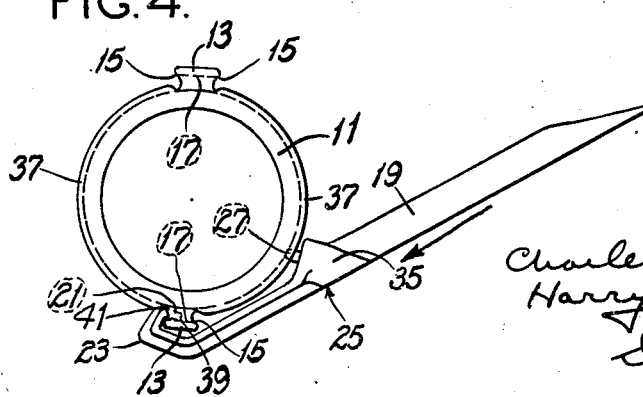

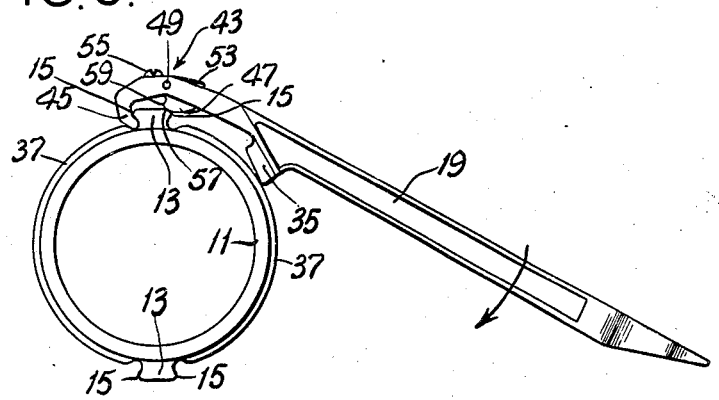
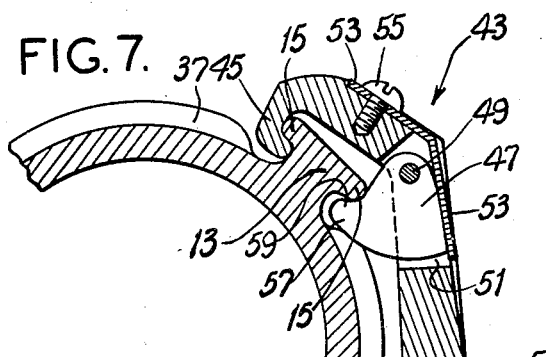
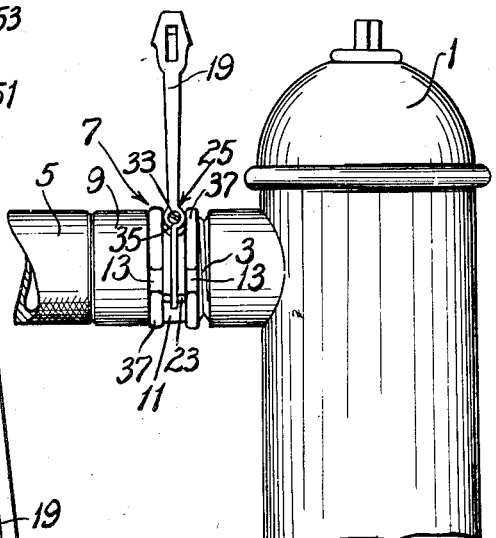

Nov. 21, 1933. C. K. HUTHSING ET AL 1,936,359
COUPLING MEANS
Filed March 31, 1932   3 Sheets-Sheet 3
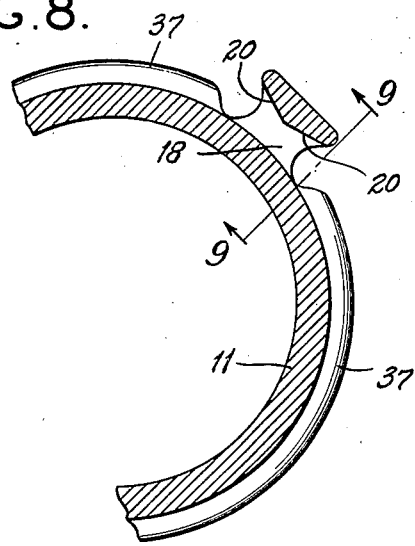
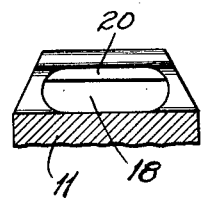
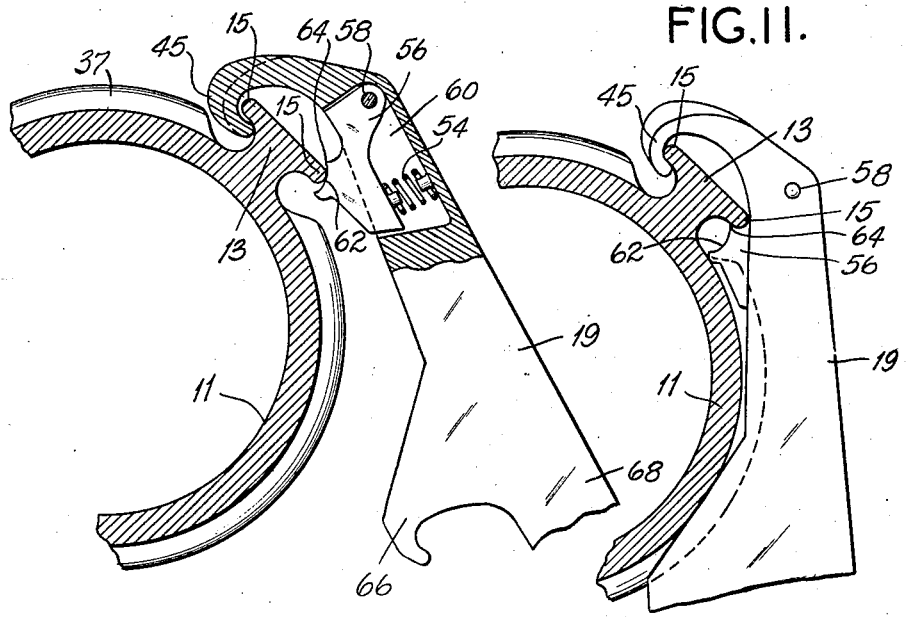

Patented Nov. 21, 1933

1,936,359

UNITED STATES PATENT OFFICE 1,936,359

COUPLING MEANS

Charles K. Huthsing, Clayton, and Harry G. Eyre, St. Louis, Mo.; said Eyre assignor to said Huthsing Application March 31, 1932. Serial No. 602,144

8 Claims. (Cl. 285—120)

This invention relates to coupling means, and with regard to certain more specific features, to coupling means adapted to be used between fire hose and fire hydrants or the like.

Among the several objects of the invention may be noted the provision of improved coupling means adapted to be quickly and effectively operated under emergency conditions; that provision of means of this class including a collar having special wrench-engaging lugs and a wrench which is adapted to engage said lugs and to be held thereto while engaged, the wrench being readily removable by a simple motion of the operator's hand; and the provision of a device of the class described which is simple to manufacture and operate, as well as being economical. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated several of various possible embodiments of the invention, Fig. 1 is a side elevation showing the application of one form of the invention to coupling a fitting to a fire hydrant;

Fig. 2 is a cross section taken on line 2—2 of Fig. 1;

Fig. 3 is a view similar to Fig. 1 showing the wrench positioned for disengaging the hose from the hydrant, instead of for engagement as is shown in Fig. 1;

Fig. 4 is an end view showing a disengaging position;

Fig. 5 is a view similar to Fig. 4, but enlarged, showing a position preliminary to removing the wrench or applying the same;

Fig. 6 is an end elevation showing a modified form of the invention being applied to a coupling;

Fig. 7 is an enlarged view similar to Fig. 6, but showing parts broken away for clarity and showing a final position of the wrench on the coupling.

Fig. 8 is a lateral section showing a form of lug alternative to that shown in Fig. 5;

Fig. 9 is a longitudinal section taken on line 9—9 of Fig. 8;

Fig. 10 is a view similar to Fig. 7 showing another form of wrench being applied; and Fig. 11 is a view similar to Fig. 10 showing said wrench on its lug.

Similar reference characters indicate corresponding parts throughout the several views of the drawings.

Referring now more particularly to Fig. 1, there is shown at numeral 1 a fire hydrant having a threaded outlet 3 to which a hose 5 is to be attached. For connecting the hose 5 to the hydrant 1, there is ordinarily used a coupling 7 comprising a thimble 9 for attachment to the hose 5 and a threaded, swivel ring 11, which is adapted to be threaded to said outlet 3. The ring 11 carries a plurality of lugs 13 adapted to be engaged by a spanner wrench for turning the coupling 7 into engagement with the outlet 3 or turning it out of engagement.

Heretofore, lugs have been used which were engaged by a spanner wrench but the engagement between the lugs and/or the wrenches were of such a nature that over certain fractions of the turn, a new grip needed to be obtained between the wrench and a succeeding lug. Continuous turning could not be effected because the wrench disengaged from the lug when not manually held to it. Furthermore, it was awkward to continue gripping the same throughout a complete revolution. If the wrench were not gripped it would drop from the coupling, and in emergencies such as occur in coupling fire hoses, this was very undesirable.

In order to meet the above difficulties, we have provided the lugs 13 with overhanging edges 15 and each lug with an opening or hole 17 passing entirely through the same between and below the overhanging lips 15.

In Figs. 2 and 5 the lug is shown as having an opening therethrough having a flat upper portion. Figs. 8 and 9 show alternatives wherein each lug is provided with an opening 18 therethrough having an upper surface with downwardly converging, sloping surfaces 20, the purpose of which is to facilitate guidance of the wrench element into the opening.

The new wrench comprises a handle 19 having a curled-under extension or hook 21 of a length adapted to be substantially projected into the passage or opening 17. The curled end 23 of the wrench passing over the respective lug 13 to aid in gripping and placing the same.

At a suitable point on the handle 19 is located a reaction member 25 comprising a plug 27 slidably arranged in an opening 29 and backed by a spring 31, the latter reacting against a threaded plug 33. A suitable lug 35 is arranged on the handle 19 for accommodating the parts 27 to 33.

The operation of this form of the invention is illustrated in Figs. 1 to 5, and comprises positioning the wrench as illustrated in Fig. 5, that is, the extension 21 is brought into the opening 17 at the same time that the reaction member 25 is applied to the ring 11. This compresses the spring 31 and permits ready entrance of the extension 21 into said recess 17. Thus the ring 11 may be turned on (Fig. 1), or off (Fig. 3), by means of the wrench as applied in Figs. 5 or 4. It should be understood that the raised peripheral ridges of material 37 on either side of the lugs 33, serve to strengthen the ring 11 and provide a channel for directing the application of the wrench to the lugs 13, the same guiding the lug 35.

In Fig. 2 is shown the arrangement of parts when the operator releases the handle 19 with the object of rearranging his grip thereon after a partial rotation; or with the object of leaving the coupling after having suitably tightened or loosened it. In this event, the reaction member 25, under expanding action of the spring 31 tends to move the wrench handle counterclockwise, and thus causes the extension 21 to rotate in the opening 17 so that contacts 39 and 41 are established which provide a reaction which prevents inadvertent separation of the wrench from the ring and its lug. For instance, in Fig. 4 is shown the wrench positioned on the bottom of the ring, the same being properly held in position by the reactions described. The same grip is effective at any angular positioning of the wrench, the ones shown being illustrative.

If it be desired to quickly remove the wrench, this can be readily done by pushing the handle 19 in the general direction shown by the arrow in Fig. 4. This will cause compression of the spring 31 so that the wrench takes up the general position shown in Fig. 5. Thereupon, after continuing the pressure in said direction, the extension 21 leaves the opening 17. It will be seen from the above that the wrench is tensioned on the ring 11, without being positively held on the same. This tensioning is enough to prevent dropping of the wrench when the hands are taken therefrom, but not enough to substantially interfere with wrench removal by manual means.

In Figs. 6 and 7 is shown another form of the invention wherein a solid lug 13 may be used having only the overhanging lips 15, or, it will be understood, a lug such as shown in Figs. 1 to 5 may be used.

In the modification of Figs. 6 and 7, the wrench again includes the handle 19 and a contacting lug 35, but the lug 35 does not incorporate the reaction feature therein. The reaction feature is shown at numeral 43 and is located directly opposite a hook 45, said hook 45 being on the end of the wrench. As the drawings show, the hook 45 does not extend as great a distance as does the extension 21 of the form of the invention shown in Figs. 1 to 5. This is because the grip of the wrench in this modification does not depend upon the turning of any extension within a recess.

The reaction member 43 comprises a dog 47 pivoted as shown at 49 in a bifurcation 51 of the wrench. Covering the bifurcation 51 and providing a spring reaction for the dog 47 is a leaf spring 53 held in place by an anchor bolt 55. The dog 47 is rounded as shown at numeral 57 and 59 so that upon application of the wrench, as shown in Fig. 6, the dog will be rotated against the reaction of spring 53 to permit of the dog to ride over its respective lip 15. The wrench is at this time turning in the direction of the arrow shown in Fig. 6.

Finally, when the lug 35 comes into contact with the ring 11 (Fig. 7), the curved portion 57, 59 of the dog 47 drops in behind the lip 15 to resiliently hold the wrench in place, even though the operator's grip be released.

Upon turning the wrench in the direction shown by the arrow in Fig. 7, the resilient hold of the dog 47 in connection with the hook 45 is easily broken.

In Figs. 10 and 11 is shown a form of the invention similar to that shown in Figs. 6 and 7 wherein a coil spring 54 is used instead of the leaf spring, the dog 56 being pivoted at 58 within a recess 60. The wrench has the claw 45 for engaging the lug 13. Opposite the claw, the dog 56 has guiding surfaces 62, the purpose of which is to insure easy application of the wrench and to insure proper positioning of said wrench on the lug 13. Above the sloping portion 62 is a small protrusion 64 which, after it passes over the lip 15 of the lug 13 effects a semi-locking or resilient locking action of the wrench in position on the coupling. This form of wrench is also provided with a claw 66 for use on smaller sizes of couplings in cases of emergency. It will be seen that the claw 66 is closer to the handle portion 68 of this form of wrench, which is as it should be, because the smaller couplings require less leverage.

It should also be understood in connection with the above that one of the purposes of the invention is to prevent the necessity for re-setting the wrench on succeeding dogs as successive revolution of the ring 11 are desired. All that is necessary is to apply the wrench to one dog at the beginning of the operation and leave it there, continuous turning being easily effected by partially rotating the ring and then obtaining a new grip on the wrench in its old location on the lug to which it was originally applied.

We have found in connection with the form of the invention shown in Figs. 1 to 5, that the reaction member 25 may be dispensed with if the extension 21 is made long enough, for under such circumstances, the effect of gravity on the wrench is such as to twist the extension 21 in the recess 17 and provide a reaction grip at all except one critical angular location. This method of carrying out the invention is useful but the above described forms are preferred.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. Apparatus of the class described comprising coupling means adapted to be turned, at least one lug on said coupling means, said lug having an opening entirely therethrough, and a wrench adapted to engage said lug, said wrench having a hooked extension, the extension being adapted to be introduced into said opening, a handle for said wrench extending from said hooked extension, and a resiliently mounted reaction member on said handle adapted to rotate the handle when released to effect a gripping action of said extension in the opening of the lug.

2. Apparatus of the class described comprising coupling means adapted to be turned, at least one lug on said coupling means, said lug having an opening entirely therethrough, and a wrench adapted to engage said lug, said wrench having an extension adapted to be introduced into said opening, a handle for said wrench formed with said extension, a resiliently mounted reaction member associated with said handle adapted to permit easy application of the extension to the opening and when free to react to turn the wrench so that said extension contacts with the lug within said opening to automatically hold the wrench on the coupling.

3. In apparatus of the class described, a coupling comprising at least one lug having undercut portions, a wrench having a hooked region adapted to engage one of said undercut portions, a dog articulated to said wrench opposite said hooked portion, a spring normally holding the dog pressing the dog toward said curled-over portion, whereby resilient gripping of a dog is effected upon application of the wrench.

4. In apparatus of the class described, a coupling comprising at least one lug having undercut portions, a wrench having a hooked region adapted to engage one of said undercut portions, a dog articulated to said wrench opposite said hooked portion, a spring normally holding the dog pressing the dog toward said curled-over portion whereby resilient gripping of a dog is effected upon application of the wrench and a lug on the wrench spaced from said dogs and adapted to contact with the coupling carrying said lugs when the wrench is manipulated to turn the coupling.

5. In apparatus of the class described, a coupling having at least one lug with undercut portions, a wrench, said wrench having a hooked element adapted to cooperate with one of said undercut portions, a dog articulated to said wrench at a point substantially opposite the curled-over portion, a bifurcation in said wrench accommodating the dog, a leaf spring closing said bifurcations and tending to press the dog toward said hooked element, said leaf spring being attached to the wrench and anchoring means on the wrench for holding said leaf spring.

6. In a fire hose coupling, a lug comprising a bridge portion having an opening extending entirely through the bridge portion.

7. In a fire hose coupling, a lug comprising a bridge portion having an opening extending entirely through the bridge portion, said opening having a flat top.

8. In a fire hose coupling, a lug comprising a bridge portion having an opening extending entirely through the bridge portion, said opening having a top slanting downwardly from each end of the opening to form a wrench guide.

CHARLES K. HUTHSING.
HARRY G. EYRE.